April 2, 1968 S. WEINSTOCK 3,376,434

PULSE DISTRIBUTION AMPLIFIER

Filed April 2, 1965 2 Sheets-Sheet 1

INVENTOR.
SOL WEINSTOCK
BY Eugene M. Whitacre
Attorney

PULSE DISTRIBUTION AMPLIFIER

Filed April 2, 1965 2 Sheets-Sheet 2

INVENTOR.
SOL WEINSTOCK
BY
Eugene M. Whitacre
Attorney

United States Patent Office 3,376,434
Patented Apr. 2, 1968

3,376,434

PULSE DISTRIBUTION AMPLIFIER

Sol Weinstock, Riverside, N.J., assignor to Radio Corporation of America, a corporation of Delaware Filed Apr. 2, 1965, Ser. No. 444,992
9 Claims. (Cl. 307—268)

ABSTRACT OF THE DISCLOSURE

Apparatus for re-forming degraded input pulses by generating output pulses having leading corners of positive and negative transitions in time coincidence with respective leading corners of degraded input pulses, and also having decreased rise and fall times.

Figures 1, 2, 3:
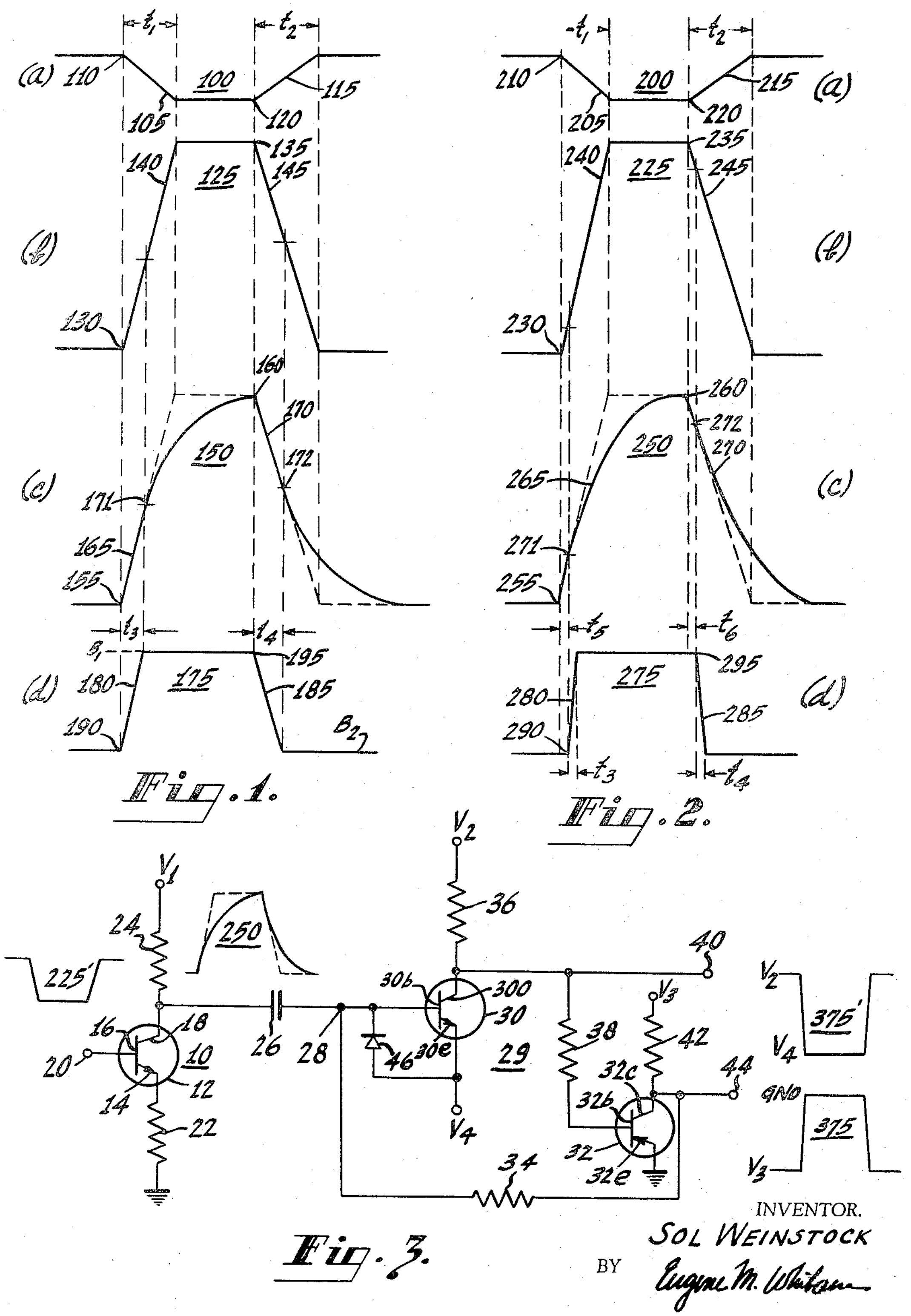

This invention relates to a pulse distribution amplifier and, more particularly, to an improvement of the pulse distribution amplifier described in co-pending application Ser. No. 253,423, filed Jan. 23, 1963, and entitled, "Pulse Re-forming Method and Apparatus."

As is described in application 253,423, the pulse distribution amplifier there disclosed re-forms degraded pulses by generating output pulses having leading corners of positive and negative transitions in time coincidence with respective leading corners of degraded input pulses. The time period between the leading corner of the leading edge and the leading corner of the trailing edge of each output pulse generated is then equal to the time period between the respective leading corners of each input pulse supplied. Such a re-forming method, it is there pointed out, provides a more accurate reproduction of the width of the input pulse than is provided by older, more conventional methods. This, in turn, provides for more accurate performance of the several television broadcast equipment to which the reformed pulses are distributed.

It is an object of the present invention to provide a pulse distribution amplifier similar to the one described above, but one which produces re-formed pulses having steeper leading and trailing edges than are there produced.

While the aforementioned pulse distribution amplifier is completely adequate to perform its intended functions, one constructed according to the present invention provides the additional feature of more easily complying with the Electronic Industries Association's standards respecting rise and fall times of distributed pulses for television broadcast equipments.

In accordance with the invention, in apparatus for re-forming pulses there is included a bistable multivibrator having first and second electronic valves. The apparatus also includes a unidirectional current conducting device for establishing across the input circuit of the first electronic valve, a first biasing voltage of a value and of a polarity to place the first valve in a predetermined one of two possible conductivity states. The apparatus additionally includes amplifier means responsive to the respective leading corners of the leading and trailing edges of supplied input pulses for respectively initiating at its output terminal corresponding leading and trailing edges of output pulses. The apparatus further includes a capacitor for coupling the leading and trailing edges of the output pulses to the multivibrator. As will become clear hereinafter, the first electronic valve is switched from its first conductivity state to its second conductivity state when the voltage excursions of the leading edges of the output pulses exceed the first biasing voltage, to charge the capacitor. The first electronic valve is also switched from its second conductivity state to its first conductivity state when the voltage excursions of the trailing edges of the output pulses exceed a second biasing voltage established across the input circuit by the first valve when in its first conductivity state, to discharge the capacitor.

Figure 4:
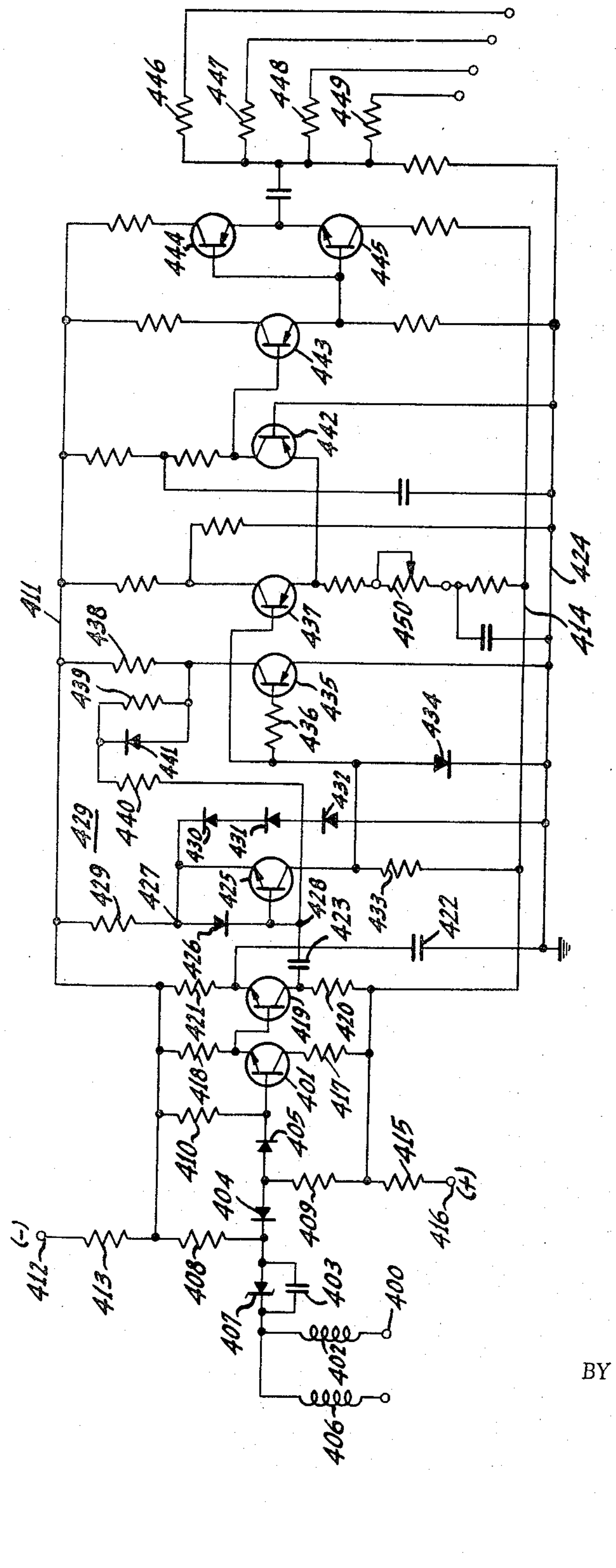

The novel features that are considered characteristic of this invention are set forth with particularity in the appended claims. The invention itself, however, both as to its organization and method of operation, as well as additional objects and advantages thereof, will best be understood from the following description when read in connection with the accompanying drawings in which:

FIGURES 1(*a*)–1(*d*) are graphical representations of waveforms generated within the pulse distribution amplifier of application 253,423;

FIGURES 2(*a*)–2(*d*) are graphical representations of corresponding waveforms generated within the pulse distribution amplifier of the present invention;

FIGURE 3 is a schematic diagram of that portion of the amplifier which produces the waveform of FIGURE 2(*d*) from the input waveform of FIGURE 2(*a*); and FIGURE 4 is a schematic diagram of a pulse distribution amplifier constructed according to the principles of the present invention.

Referring to the drawings, and more particularly to FIGURE 1, there are shown graphical representations of some signal waveforms generated within the pulse distribution amplifier of application 253,423.

Waveform 100 in FIGURE 1(*a*) illustrates the input pulse to be re-formed. The leading corner of the leading edge 105 of pulse 100 is indicated as 110 and the leading corner of the trailing edge 115 is indicated as 120. The rise time of pulse 100 is indicated as $t_1$ and the fall time as $t_2$.

Waveform 125 in FIGURE 1(*b*) illustrates the pulse obtained by inverting and amplifying the pulse 100. Pulse 125 has the same rise and fall times $t_1$ and $t_2$, respectively, as pulse 100. Pulse 125 also has the same time period between the leading corners 130 and 135 of the leading and trailing edges 140 and 145, respectively, as does pulse 100.

Waveform 150 in FIGURE 1(*c*) illustrates an intermediate pulse developed within the pulse distribution amplifier. The dotted line portion represents the pulse which would be developed were it not for the operation of the apparatus connected to the pulse amplifying and inverting circuitry. The solid line represents the actual pulse developed. Pulse 150 has the same time period between the leading corners 155 and 160 of the leading and trailing edges, 165 and 170, respectively, as does pulse 100.

Waveform 175 in FIGURE 1(*d*) illustrates a re-formed output pulse developed from pulse 150.

The re-formed pulse 175 is developed in the following way by the apparatus disclosed in co-pending application 253,423. Two unidirectional current conducting devices, e.g., diodes, connected in series and in the same polarity are initially both non-conductive. The pulse 150 is coupled to the junction point of these devices. Both unidirectional devices remain non-conductive until the leading edge 165 of pulse 150 reaches a voltage indicated by the point 171, at which time one of the devices is rendered conductive. That device remains conductive, clamping the junction point to a given voltage $B_1$ until the leading edge 165 reaches the leading corner 160 of the trailing edge 170. It is then rendered non-conductive by the trailing edge 170. Both unidirectional devices then remain non-conductive until the trailing edge 170 reaches a voltage indicated by the point, 172, at which time the other unidirectional device is rendered conductive. That device then clamps the junction point to a different voltage $B_2$. This $B_2$ voltage level is then maintained constant for the duration of the trailing edge. Thus, at the junction point of the two devices, an output pulse is developed (waveform 175) whose leading edge 180 follows the leading edge of pulse 150 from the leading corner 155 to the point 171, and whose trailing edge 185 follows the trailing edge of pulse 150 from the leading corner 160 to the point 172. Between those time periods the pulse is clamped to the voltage $B_1$.

It will be noted that pulse 175 has a rise time $t_3$ which is shorter than the rise time $t_1$ of pulses 100, 125, or 150. Pulse 175 also has a fall time $t_4$ which is shorter than the fall time $t_2$ of these same pulses. The leading edge 180 of pulse 175, furthermore, is formed to have a leading corner 190 corresponding to the leading corner of the leading edges of pulses 100, 125, or 150. The trailing edge 185 of pulse 175, in addition, is formed to have a leading corner 195 corresponding to the leading corner of the trailing edges of those pulses.

Thus, the pulse distribution amplifier of application 253,423 develops a pulse having a time period between the leading corners of its leading and trailing edges equal to the time period between the leading corners of the leading and trailing edges of the original input pulse and, also having decreased rise and fall times. This pulse can then be transmitted through cascaded circuits and through portions of a passive transmission system without losing the original relationship between the leading corners of the transitions. The relationship will be maintained even if changes are made in the system which may affect rise time.

As will become clear below, the pulse distribution amplifier constructed in accordance with the present invention produces a re-formed pulse also having the same relationship between the leading corners of the input pulse transitions, but having steeper rise and fall times than are had by the re-formed pulse of the 253,423 application. This is accomplished via the switching characteristics of a bistable multivibrator circuit rather than via the clamping characteristics of unidirectional current conducting devices.

There is thus shown in FIGURE 3 a schematic diagram of that portion of the pulse distribution amplifier of the present invention which produces the re-formed pulse. In FIGURE 3, a low-output impedance amplifier 10 is provided. Amplifier 10 includes an NPN transistor 12, having emitter, base, and collector electrodes 14, 16 and 18, respectively. The base electrode 16 is connected to an input terminal 20 while the emitter electrode 14 is coupled to ground potential via a resistor 22. The collector electrode 18 is coupled to a source of unidirectional potential $V_1$ (plus) via a resistor 24 and to one side of a capacitor 26, the other side of which is connected to a junction point 28.

A bistable multivibrator 29 is also provided in FIGURE 3. It includes an NPN transistor 30 and a PNP transistor 32. The base electrode **30*b* of transistor 30 is connected to the junction point 28 and to the collector electrode 32*c* of transistor 32 via a resistor 34. The collector electrode 30*c* of transistor 30 is coupled to a source of unidirectional potential $V_2$ (plus) via resistor 36, to the base electrode 32*b* of transistor 32 via a resistor 38, and to an output terminal 40. The collector electrode 32*c* of transistor 32 is coupled to a source of unidirectional potential $V_3$ (minus) via a resistor 42 and to an output terminal 44. The emitter electrode 30*e* of transistor 30 is connected to a source of unidirectional potential $V_4$ (minus) while the emitter electrode 32*e* of transistor 32 is connected to ground. Bistable multivibrator 29 has two stable states. In one stable state, both transistor 30 and 32 are non-conductive. In its other stable state, both transistors 30 and 32** are conductive.

A unidirectional current conducting device is further provided in FIGURE 3. Shown as the diode 46, this device is connected in the input circuit of transistor 30. More particularly, the anode of diode 46 is connected to the emitter electrode **30*e* of transistor 30 while the cathode of diode 46 is connected to the base electrode 30*b***.

For purposes of illustration and comparison, it will be assumed that the input pulse to be re-formed is a negative pulse identical in waveshape to the input pulse to be re-formed by the pulse distribution amplifier of co-pending application 253,423 and represented by the waveform 100 in FIGURE 1(*a*) herein. Thus, the leading corner 210 of the leading edge 205 of such an identical pulse 200 shown in FIGURE 2(*a*) corresponds in time to the leading corner 110 of the leading edge 105 of pulse 100 in FIGURE 1(*a*). Similarly, the leading corner 220 of the trailing edge 215 of pulse 200 corresponds in time to the leading corner 120 of the trailing edge 115 of pulse 100. The rise time of pulse 200 is also indicated as $t_1$ and the fall time as $t_2$.

In operation, the pulse 200 is amplified at an input stage (not shown), thereby producing a pulse having the waveform shown at 225' in FIGURE 3. Pulse 225' is an inversion of the pulse shown as 225 in FIGURE 2(*b*). Pulse 225 is illustrated in FIGURE 2(*b*) rather than pulse 225' to more clearly point out the differences between the re-forming method of the co-pending 253,423 application and that of the present invention. Pulse 225 (and also pulse 225') has the same rise and fall times $t_1$ and $t_2$ respectively as pulse 200 of FIGURE 2(*a*). Pulse 225 also has the same time period between the leading corners 230 and 235 of the leading and trailing edges 240 and 245, respectively, as does pulse 200. The amplifier 10 to which the input pulse 225' is applied via terminal 20 is assumed to be an inverter amplifier having unity gain.

The output pulse from the amplifier 10 is represented in FIGURES 2(*c*) and 3 by the waveform 250. As with pulse 150 of FIGURE 1(*c*), the dotted line portion represents the output pulse that would be obtained were it not for the operation of the remainder of the pulse re-forming circuitry. The solid line of pulse 250 represents the actual output pulse obtained. This solid line pulse and the re-formed output pulse developed from it are generated in the following manner.

Let it be assumed that, at the time of the beginning of the input pulse 200, the capacitor 26 is in a state of equilibrium. Let it also be assumed that transistors 30 and 32 are non-conductive at this time. The positive voltage at the collector electrode **30*c* of transistor 30 then hold transistor 32 non-conductive while the negative voltage at the collector electrode 32*c* of transistor 32 is sufficient to hold transistor 30 "off." Potential source $V_4$ is so chosen to forward bias diode 46 for this condition. The voltage at the base electrode 30*b* of transistor 30 is, therefore, clamped to a level which is negative with respect to that at the emitter electrode 30*e* by an amount equal to the forward voltage drop across the diode 46**.

With the application of the input pulse 200, the voltage at the base electrode **30*b* of transistor 30 begins to rise, following the leading edge 265 of the pulse 250. A point 271 is eventually reached on the leading edge 265 at which the voltage is sufficient to overcome the forward bias on diode 46, and render transistor 30 conductive. The resulting decrease in voltage at the collector electrode 30*c* of transistor 30 turns transistor 32 "on." The increase in voltage at the collector electrode 32*c* of transistor 32 turns transistor 30 "on" all the more, due to the regenerative action of the multivibrator 29. The voltage at the base electrode 30*b* of transistor 30 is then clamped to a level which is positive with respect to that at the emitter electrode 30*e* by an amount equal to the base-to-emitter drop of transistor 30. The change in voltage at the base electrode 30*b*, therefore, equals the sum of the forward voltage drop of diode 46 and the forward base-to-emitter voltage drop of transistor 30**. With typical switching diodes and transistors, this change is of the order of one volt.

Since the voltage across capacitor 26 cannot change instantaneously, the voltage at the collector electrode 18 of transistor 12 also becomes clamped after the initial one volt change (increase). Capacitor 26 then charges through resistor 24 and the low input impedance of transistor 30. The voltage at the collector electrode 18 thus continues to rise exponentially until it reaches that value that it would have reached almost immediately if resistor 24 had been the only load on the collector electrode 18. Resistor 24 and/or capacitor 26 are so chosen that voltage value is reached at a time prior to the trailing edge transition of the smallest width pulse to be re-formed.

With the occurrence of the trailing edge of the input pulse 200, the voltage at the base electrode 30*b* of transistor 30 begins to fall, following the trailing edge of the pulse 250. A point is eventually reached at which the voltage at the base electrode is insufficient to maintain transistor 30 conductive. Transistor 30 is therefore rendered non-conductive and the resulting increase in voltage at its collector electrode 32*c* causes transistor 32 to also turn "off." Diode 46 becomes forward biased once again and clamps the voltage at the base electrode 30*b* of transistor 30 to that level which is negative with respect to the voltage at the emitter electrode 30*e* by the forward voltage drop across it. Again, since the voltage across capacitor 26 cannot change instantaneously, the voltage at the collector electrode 18 of transistor 12 becomes clamped after this one volt change (decrease). Thereafter, capacitor discharges its former voltage through resistor 24 and diode 46. The voltage at the collector electrode 18 of transistor 12 then continues to fall until it reaches that value that it would have reached almost immediately if resistor 24 had been the only load on the collector electrode 18.

Pulses 375 and 375' in FIGURE 3 represent the reformed pulses developed in this manner.

As shown, they are opposite polarity pulses developed by multivibrator 29 from the first volt of the leading and trailing edges of pulse 250. It can be seen from FIGURE 2(*d*) that the leading corner 290 of the leading edge 280 of output pulse 275 is time coincident with point 271 on the leading edge 265 of pulse 250, the point at which transistor 30 is rendered conductive. Similarly, the leading corner 295 of the trailing edge 285 of output pulse 275 is time coincident with point 272 on the trailing edge 270 of pulse 250, the point at which transistor 30 is rendered non-conductive once again. Due to the time delay in reaching those voltage values the leading corners 290 and 295 of pulse 275 are displaced from the corresponding leading corners 255 and 260 of pulse 250, but by equal amounts so that the time period between the leading corners of the leading edges and the leading corners of the trailing edges remains constant. The rise and fall times $t_3$ and $t_4$ respectively of pulse 275 of FIGURE 2(*d*) however is determined solely by the multivibrator 29 and are much shorter than the corresponding rise and fall times of the input pulse 200. A comparison of FIGURE 2(*d*) with FIGURE 1(*d*) also shows that the rise and fall times of pulse 275 are markedly less than the corresponding rise and fall times of the output pulses developed using the pulse re-forming techniques of application 253,423.

The pulse waveform shown in FIGURE 2(*d*) is in actuality only an idealized waveform. In practice it has been found that ringing effects may be present due to the passage of pulse 275 through the various electronic circuits. Also, the leading corners of the leading and trailing edges of input pulse 200 are not always clearly defined because of the degradation of the pulse 200 which may have taken place in the auxiliary circuits. To minimize these effects, only a portion of the re-formed pulse 275 is actually used. This will be more clearly understood from a consideration of FIGURE 4.

FIGURE 4 shows a complete circuit for producing the results diagrammatically illustrated in FIGURES 2(*a*)–2(*d*) as utilized in a pulse distribution amplifier. The negative pulses to be re-formed are applied to input terminal 400 and from there to the base electrode of an input amplifier NPN transistor 401 by means of an inductor 402, a capacitor 403 and diodes 404 and 405. Also provided at the input circuit to the amplifier are an inductor 406, a zener diode 407, and resistors 48, 49, and 410.

The upper ends of resistors 408 and 410 are connected to conductor 411 which, in turn, is connected to a source of negative potential through decoupling resistor 143. Such potential source may provide a voltage of −15 volts at terminal 412. The lower end of resistor 409 is connected to conductor 414 which, in turn, is connected to a source of positive potential through decoupling resistor 415. Such potential source may provide a voltage of the order of +15 volts at terminal 416.

The inductors 402 and 406, together with the amplifier input capacity-to-ground, form a T-section, constant-K filter providing an image impedance, for example of 75 ohms. The inductors 402 and 406 therefore serve to compensate for the input capacity of the amplifier shown in FIGURE 4. This arrangement also permits a pulse to be taken from inductor 406 which will be the same as the input pulse, for use in other circuitry, if desired.

The diodes 404 and 405 and their associated resistors 408, 409, and 410 form an input protection circuit for the pulse distribution amplifier. The zener diode 407, which is connected across the capacitor 403, provides overload protection for this capacitor.

The base electrode of transistor 401 is connected to the biasing network consisting of resistors 408, 409, and 410, and diodes 404 and 405. The collector electrode of transistor 401 is connected to the positive conductor 414 by means of a resistor 417. The emitter electrode of transistor 401 is connected to one end of resistor 418, the other end of which is connected to the negative conductor 411, and also to the base electrode of NPN transistor 419. The collector electrode of transistor 419 is connected to the positive conductor 414 via a resistor 420. The emitter electrode of transistor 419 is connected to resistor 421, the other end of which is connected to the negative conductor 411. A peaking capacitor 422 is connected between the emitter electrode of transistor 419 and a ground potential conductor 424.

Transistors 401 and 419 correspond to transistor 12 in FIGURE 3. They amplify and invert the negative input pulse applied to the terminal 400, producing at the collector electrode of transistor 419 a positive pulse having a nominal amplitude of 10 volts for an input pulse of 4 volts. This pulse is substantially equivalent to the pulse 250 of FIGURE 3. It is applied through a coupling capacitor 423 to a terminal 428 corresponding to the terminal 28 of FIGURE 3. Two transistors are used as the input amplifier so as not to load down the input circuit when resistor 420 is made substantially less than 1000 ohms to provide a fast charge time and discharge time for capacitor 423. In other words, resistor 420 and capacitor 423 correspond to resistor 24 and capacitor 26 respectively in FIGURE 3.

Connected to the terminal 428 is the base electrode of NPN transistor 425 and the cathode of diode 426 (diode 46 in FIGURE 3), the anode of which is connected to the junction point 427. Also connected to the junction point 427 is the end of resistor 429, remote from the negative conductor 411, the emitter electrode of transistor 425, and the upper end of a series circuit including diodes 430, 431, and 432, the lower end of which is connected to the ground potential conductor 424. Resistor 429 and diodes 430, 431, and 432 comprise a low voltage source of about −2 volts, corresponding to the voltage source $V_4$ in FIGURE 3. The collector electrode of transistor 425 is connected to the positive conductor 414 via a resistor 433 and to the ground potential conductor 424 via a diode 434.

Transistor 425 and its associated components form one-half of the multivibrator 29 of FIGURE 3 (429 in FIGURE 4. The other half includes the PNP transistor 435. The emitter electrode of transistor 435 is connected to the ground conductor 424 while the base electrode is connected via a resistor 436 to the collector electrode of transistor 425 and to the base electrode of a following PNP transistor 437. The collector electrode of transistor 435 is connected via a resistor 438 to the negative conductor 411 and via the series network consisting of resistors 439 and 440 and diode 441 to the junction point 428. This network presents the impedance of resistor 440 alone when passing the forward base current of transistor 425 but presents the higher impedance of resistors 440 and 439 in series when passing the much smaller back-biasing current of transistor 425. This decreases the delay of the multivibrator 429 without sacrificing reliability. The pulse output of the multivibrator 429 at its collector electrode of transistor 425 is limited by the emitter voltage and diode 434 so that the voltage at its collector electrode varies between +1 and −1 volts. The main purpose of this is to protect the following transistor 437.

In operation, the circuit thus far described in FIGURE 4 is substantially similar to that shown in FIGURE 3.

The input pulse 200 which is applied to the input terminal 400 and which is to be re-formed is amplified in the transistor 401, as indicated above. This negative pulse, substantially equivalent to pulse 225′ of FIGURE 3 and to the inversion of pulse 225 of FIGURE 2(*b*), is coupled from the emitter electrode of transistor 401 to the base electrode of the transistor 419. This pulse tends to produce at the collector electrode of transistor 419, the dotted waveform of pulse 250 of FIGURES 2(*b*) and 3. This pulse is coupled by means of capacitor 423 to the terminal 428 and from there to the base electrode of transistor 425.

For approximately the first one volt of the leading edge 265 of waveform 250, transistors 425 and 435, assumed to be initially non-conductive, remain non-conductive. When that one volt point is exceeded, transistor 425 is turned "on" and the voltage at its base electrode is clamped by the base-to-emitter voltage drop of transistor 425. Transistor 435 is also turned "on" by the regenerative action of the multivibrator. Coupling capacitor 423 then then charges through the resistor 420 and the input impedance of transistor 425. The potential at the collector electrode of transistor 425 will, therefore, decrease to the −2 volt level established by resistor 429 and diodes 430–432, inclusive, while that at the collector electrode of transistor 435 will increase to ground potential. These two levels will be maintained for as long as transistors 425 and 435 remain conductive. The decrease in potential is shown by the leading edge of pulse 375′ in FIGURE 3 where the −2 volt level is shown as the voltage $V_4$. Correspondingly, the increase in potential is shown by the leading edges of pulses 375 and 275 in FIGURES 3 and 2(*d*) respectively, where the ground level is shown as indicated.

As described above with respect to FIGURE 3, the capacitor 423 will be fully charged before the pulse appearing at the terminal 428 begins its negative transition. When this negative transition is initiated, and for the first one volt thereof, transistors 425 and 435 remain conductive. There is thus, no change in the potential at their collector electrodes. When that one volt point is exceeded, the voltage at the base electrode of transistor 425 is insufficient to maintain transistor 425 conductive. It is therefore rendered non-conductive and, in turn, renders transistor 435 non-conductive by the aforementioned regenerative action. The potential at the collector electrode of transistor 425 will, as a result, increase to the voltage of the positive conductor 414 while that at the collector electrode of transistor 435 will decrease to the voltage of the negative conductor 411. These two levels will be maintained for as long as transistors 425 and 435 remain non-conductive. The increase in potential is shown by the trailing edge of pulse 375′ in FIGURE 3 where the voltage at the positive conductor is shown as the voltage $V_2$. Correspondingly, the decrease in potential is shown by the trailing edges of pulses 375 and 275 in FIGURES 2(*d*) and 3 respectively, where the voltage at the negative conductor is shown as the voltage $V_3$. Coupling capacitor 423 discharges through resistor 420 and diode 426 when transistors 425 and 435 are rendered non-conductive.

As was previously mentioned, it would be desirable to use in the pulse distribution amplifier operation only a portion of the output pulses developed. This is because of the ringing that may very well accompany the pulses developed. Thus in FIGURE 4, a transistorized current switch is provided to clip and amplify the output pulses developed. This switch includes transistor 437 and potentiometer 450 to clip the pulse at a level determined by potentiometer 450 and, also, PNP transistor 442 to amplify the clipped signal to a desired level of approximately eight volts. The clipped signal is then applied to the base electrode of PNP transistor 443, which functions as an emitter-follower driver.

The output PNP and NPN transistors 444 and 445 respectively, comprise a complementary symmetry emitter follower which is capable of driving four 75 ohm transmission lines, each having a source impedance of approximately 75 ohms. These transmission lines are connected to transistors 444 and 445 by the resistors 446–449, inclusive, each of which develops a four volt signal at its far end when that end is terminated by a 75 ohm resistance.

As a consideration of the pulse waveforms of FIGURES 2(*a*) and 2(*d*) will point out, there is a certain time delay accompanying the overall operation of the apparatus of FIGURE 4. However, this time delay is substantially the same for the leading corners of both transitions and, therefore, does not appreciably affect the timing relationship between these corners. The delay is incurred primarily in the input amplifier and multivibrator stages.

Thus, the input amplifier and multivibrator of either FIGURES 3 or 4 develop output pulses whose leading corners do not precisely coincide in time with the corresponding leading corners of the pulse to be re-formed. In particular, the leading corner of the leading edge of the output pulse follows the leading corner of the leading edge of the input pulse by a time delay interval $t_5$. Similarly, the leading corner of the trailing edge of the output pulse follows the leading corner of the trailing edge of the input pulse by a time delay interval $t_6$. However, since each interval is related to the time it takes the amplified pulse to make a one volt transition, as shown in FIGURE 2(*c*), they are both equal. Therefore, the time period between the leading corners of the transitions of the input pulse is equal to the time period between the leading corners of the transitions of the output pulse. This is just as it was in the pulse distribution amplifier of the co-pending 253,423 application. The rise and fall times of the output pulses here developed, $t_3$ and $t_4$, respectively, being dependent only on the "turn on" and "turn off" times of the multivibrator transistors 425 and 435, are markedly less than the corresponding rise and fall times for the 253,423 amplifier where they were dependent upon overcoming diode biases.

While the present invention has been described as using components and voltages of a particular polarity, its teachings are not to be limited solely to the arrangement shown. Those polarities selected were chosen so as to provide for an easy comparison of the present invention with the invention discussed in the co-pending 253,423 application. If the input pulse to be re-formed were a positive pulse, for example, instead of a negative pulse as assumed here and in application 253,423, various polarity reversals, obvious to those skilled in the art, would, of course, have to be made for the invention to operate according to the invention for use in such an environment.

What is claimed is:

1. In apparatus for re-forming pulses, the combination comprising:

a bistable multivibrator having first and second electronic valves;

a unidirectional current conducting device coupled to said multivibrator for establishing across the input circuit of said first electronic valve a first biasing voltage of a value and of a polarity to place said first valve in a predetermined one of two possible conductivity states;

amplifier means responsive to the respective leading corners of the leading and trailing edges of supplied input pulses for respectively initiating at its output terminal corresponding leading and trailing edges of output pulses;

and a capacitor coupled between said amplifier means and said multivibrator for coupling the leading and trailing edges of said output pulses to said multivibrator;

whereby said first electronic valve is switchesd from its first conductivity state to its second conductivity state when the voltage excursions of the leading edges of said output pulses exceed said first biasing voltage, to charge said capacitor; and whereby said first electronic valve is switched from its second conductivity state to its first conductivity state when the voltage excursions of the trailing edges of said output pulses exceed a second biasing voltage established across said input circuit by said first electronic valve when in said first conductivity state, to discharge said capacitor.

2. In apparatus for re-forming pulses, the combination comprising:

a bistable multivibrator having first and second electronic valves;

a unidirectional current conducting device coupled to said multivibrator for establishing across the input circuit of said first electronic valve a first biasing voltage of a value and of a polarity to place said first valve in a predetermined one of two possible conductivity states;

amplifier means responsive to the respective leading corners of the leading and trailing edges of supplied input pulses for respectively initiating at its output terminal corresponding leading and trailing edges of output pulses having a given peak voltage value substantially greater than said first biasing voltage;

and a capacitor coupled between said amplifier means and said multivibrator for coupling the leading and trailing edges of said output pulses to said multivibrator;

whereby said first electronic valve is switched from its first conductivity state to its second conductivity state when the voltage excursions of the leading edges of said output pulses exceed said first biasing voltage, to charge said capacitor; and whereby said first electronic valve is switched from its second conductivity state to its first conductivity state when the voltage excursions of the trailing edges of said output pulses exceed a second biasing voltage established across said input circuit by said first electronic valve when in said first conductivity state and substantially less than said given peak voltage value, to discharge said capacitor.

3. In apparatus for re-forming pulses, the combination comprising:

a bistable multivibrator having first and second electronic valves;

a unidirectional current conducting device coupled to said multivibrator for establishing across the input circuit of said first electronic valve a first biasing voltage of a value and of a polarity to render said first valve non-conductive;

amplifier means responsive to the respective leading corners of the leading and trailing edges of supplied input pulses for respectively initiating at its output terminal corresponding leading and trailing edges of output pulses;

and a capacitor coupled between said amplifier means and said multivibrator for coupling the leading and trailing edges of said output pulses to said multivibrator;

whereby said first electronic valve is rendered conductive when the voltage excursions of the leading edges of said output pulses exceed said first biasing voltage, to charge said capacitor; and whereby said first electronic valve is rendered non-conductive when the voltage excursions of the trailing edges of said output pulses exceed a second biasing voltage established across said input circuit by said first electronic valve when conductive, to discharge said capacitor.

4. In apparatus for re-forming pulses, the combination comprising:

a bistable multivibrator having first and second transistors;

a unidirectional current conducting device coupled to said multivibrator for establishing across the input circuit of said first transistor a first biasing voltage of a value and of a polarity to render said first transistor non-conductive;

transistor amplifier means responsive to the respective leading corners of the leading and trailing edges of supplied input pulses for respectively initiating at its output terminal corresponding leading and trailing edges of output pulses;

and a capacitor coupled between said transistor amplifier means and said multivibrator for coupling the leading and trailing edges of said output pulses to said multivibrator;

whereby said first transistor is rendered conductive when the voltage excursions of the leading edges of said output pulses exceed said first biasing voltage, to charge said capacitor; and whereby said first transistor is rendered non-conductive when the voltage excursions of the trailing edges of said output pulses exceed a second voltage established across said circuit by said first transistor when conductive, to discharge said capacitor.

5. In apparatus for re-forming pulses, the combination comprising:

a bistable multivibrator having first and second complementary polarity transistors having base, emitter, and collector electrodes;

a semiconductor diode coupled to said multivibrator for establishing across the base-to-emitter junction of said first transistor a first biasing voltage of a value and of a polarity to render said first transistor non-conductive;

transistor amplifier means responsive to the respective leading corners of the leading and trailing edges of supplied input pulses for respectively initiating at its output terminal corresponding leading and trailing edges of output pulses;

and a capacitor coupled between said transistor amplifier means and said multivibrator for coupling the leading and trailing edges of said output pulses to the base electrode of said first transistor;

whereby said first transistor is rendered conductive when the voltage excursions of the leading edges of said output pulses exceed said first biasing voltage, to charge said capacitor; and whereby said first transistor is rendered non-conductive when the voltage excursions of the trailing edges of said output pulses exceed a second biasing voltage established across said base-to-emitter junction by said first transistor when conductive, to discharge said capacitor.

6. The combination according to claim 5 in which said first and said second biasing voltages respectively equal the voltage drops across said diode and the base-to-emitter junction of said first transistor when each is conductive.

7. The combination according to claim 5 in which said transistor amplifier means includes a low output impedance transistor amplifier circuit having an emitter electrode coupled to a source of reference potential, a base electrode adapted to receive the input pulses to be re-formed, and a collector electrode whereat the leading and trailing edges of output pulses are developed.

8. A pulse distribution amplifier comprising:

a bistable multivibrator having first and second electronic valves for re-forming input pulses;

a unidirectional current conducting device coupled to said multivibrator for establishing across the input circuit of said first electronic valve a first biasing voltage of a value and of a polarity to place said first valve in a predetermined one of two possible conductivity states;

amplifier means responsive to the respective leading corners of the leading and trailing edges of supplied input pulses for respectively initiating at its output terminal corresponding leading and trailing edges of output pulses;

and a capacitor coupled between said amplifier means and said multivibrator for coupling the leading and trailing edges of said output pulses to said multivibrator;

whereby said first electronic valve is switched from its first conductivity state to its second conductivity state when the voltage excursions of the leading edges of said output pulses exceed said first biasing voltage, to charge said capacitor; and whereby said first electronic valve is switched from its second conductivity state to its first conductivity state when the voltage excursions of the trailing edges of said output pulses exceed a second biasing voltage established across said input circuit by said first electronic valve when in said first conductivity state, to discharge said capacitor;

and means coupled to said multivibrator for clipping and amplifying the pulses re-formed by said multivibrator from said input pulses.

9. A pulse distribution amplifier comprising:

a bistable multivibrator having first and second transistors for re-forming input pulses;

a semiconductor diode coupled to said multivibrator for establishing across the input circuit of said first transistor a first biasing voltage of a value and of a polarity to render said first transistor non-conductive;

transistor amplifier means responsive to the respective leading corners of the leading and trailing edges of supplied input pulses for respectively initiating at its output terminal corresponding leading and trailing edges of output pulses;

and a capacitor coupled between said transistor amplifier means and said multivibrator for coupling the leading and trailing edges of said output pulses to said multivibrator;

whereby said first transistor is rendered conductive when the voltage excursions of the leading edges of said output pulses exceed said first biasing voltage, to charge said capacitor; and whereby said first transistor is rendered non-conductive when the voltage excursions of the trailing edges of said output pulses exceed a second biasing voltage established across said input circuit by said first transistor when conductive, to discharge said capacitor;

and transistor current switching means including a transistor and a potentiometer coupled to said multivibrator for clipping the pulses re-formed by said multivibrator from said input pulses at a level determined by the setting of said potentiometer, and further including a transistor for amplifying the resulting clipped signal.

References Cited

UNITED STATES PATENTS

| | | | |
|---|---|---|---|
| 3,270,288 | 8/1966 | Hackett | 307—88.5 X |
| 3,280,348 | 10/1966 | Jensen | 307—88.5 |
| 3,283,259 | 11/1966 | Banks | 307—88.5 |

ROY LAKE, *Primary Examiner.*

L. J. DAHL, *Assistant Examiner.*

UNITED STATES PATENT OFFICE
CERTIFICATE OF CORRECTION

Patent No. 3,376,434 April 2, 1968

Sol Weinstock

It is certified that error appears in the above identified patent and that said Letters Patent are hereby corrected as shown below:

Column 6, line 4, "48, 49" should read -- 408, 409 --; line 7,"143" should read -- 413 --. Column 10, line 44, after "second" insert -- biasing --; line 45, after "said", first occurrence, insert -- input --.

Signed and sealed this 18th day of November 1969.

(SEAL)
Attest:

Edward M. Fletcher, Jr.
Attesting Officer

WILLIAM E. SCHUYLER, JR.
Commissioner of Patents